United States Patent
Gill

(10) Patent No.: US 7,116,530 B2
(45) Date of Patent: Oct. 3, 2006

(54) THIN DIFFERENTIAL SPIN VALVE SENSOR HAVING BOTH PINNED AND SELF PINNED STRUCTURES FOR REDUCED DIFFICULTY IN AFM LAYER POLARITY SETTING

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 379 days.

(21) Appl. No.: 10/674,849

(22) Filed: Sep. 30, 2003

(65) Prior Publication Data

US 2005/0068684 A1    Mar. 31, 2005

(51) Int. Cl.
*G11B 5/39* (2006.01)
(52) U.S. Cl. .................................... 360/324.1
(58) Field of Classification Search ............. 360/324.1, 360/324.2
See application file for complete search history.

(56) References Cited

U.S. PATENT DOCUMENTS

| | | | |
|---|---|---|---|
| 5,701,222 A | 12/1997 | Gill et al. | |
| 5,748,399 A | 5/1998 | Gill | |
| 5,751,521 A | 5/1998 | Gill | |
| 6,185,079 B1 * | 2/2001 | Gill | 360/324.2 |
| 6,185,080 B1 * | 2/2001 | Gill | 360/324.2 |
| 6,219,208 B1 | 4/2001 | Gill | |
| 6,259,586 B1 | 7/2001 | Gill | |
| 6,317,297 B1 | 11/2001 | Tong et al. | |
| 6,418,000 B1 | 7/2002 | Gibbons et al. | |
| 6,469,873 B1 | 10/2002 | Maruyama et al. | |
| 6,473,275 B1 | 10/2002 | Gill | |
| 6,680,828 B1 * | 1/2004 | Gill | 360/314 |
| 2003/0011364 A1 | 1/2003 | Hosomi et al. | |
| 2003/0011939 A1 | 1/2003 | Gill | |

FOREIGN PATENT DOCUMENTS

| | | |
|---|---|---|
| JP | 2002185060 | 6/2002 |
| WO | WO 00/19226 | 6/2000 |

OTHER PUBLICATIONS

Jian-Gang Zhu, Spin Valve and Dual Spin Valve Heads with Synthetic Antiferromagnets, IEEE Transactions on Magnetics, Mar. 1999, 655-660, 35-2, USA.

* cited by examiner

Primary Examiner—A. J. Heinz
(74) Attorney, Agent, or Firm—John J. Oskorep, Esq.; Matthew Zises

(57) ABSTRACT

A dual/differential spin valve sensor of a magnetic head includes a first spin valve having an antiparallel (AP) "pinned" layer structure and a second spin valve having an AP "self-pinned" layer structure. The AP pinned layer structure has a magnetization direction which is fixed by an adjacent antiferromagnetic (AFM) layer, whereas the AP self-pinned layer structure has a magnetization direction which is fixed by magnetostriction as well as air bearing surface (ABS) stress. The magnetization direction of the AP pinned layer structure is fixed in a direction antiparallel to the magnetization direction of the AP self-pinned layer structure. The dual/differential spin valve sensor may be configured to have either a top AP pinned layer structure and a bottom AP self-pinned layer structure, or a top AP self-pinned layer structure and a bottom AP pinned layer structure. Advantageously, the dual/differential spin valve sensor is relatively thin and overcomes the difficulties of the AFM polarity setting process when two AP pinned layer structures are utilized.

30 Claims, 4 Drawing Sheets

THIN DIFFERENTIAL SPIN VALVE SENSOR HAVING BOTH PINNED AND SELF PINNED STRUCTURES FOR REDUCED DIFFICULTY IN AFM LAYER POLARITY SETTING

BACKGROUND OF THE INVENTION

1. Field of the Invention

This invention relates generally to spin valve sensors of magnetic heads, and more particularly to a differential spin valve sensor utilizing both an antiparallel (AP) pinned layer structure and an AP self-pinned layer structure.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read (MR) sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using two layers of ferromagnetic material (e.g. nickel-iron, cobalt-iron, or nickel-iron-cobalt) separated by a layer of nonmagnetic material (e.g. copper) are generally referred to as spin valve (SV) sensors manifesting the SV effect. In an SV sensor, one of the ferromagnetic layers, referred to as the pinned layer, has its magnetization typically pinned by exchange coupling with an antiferromagnetic (AFM) pinning layer (e.g., nickel-oxide, iron-manganese, or platinum-manganese). The pinning field generated by the AFM pinning layer should be greater than demagnetizing fields to ensure that the magnetization direction of the pinned layer remains fixed during application of external fields (e.g. fields from bits recorded on the disk). The magnetization of the other ferromagnetic layer, referred to as the free layer, however, is not fixed and is free to rotate in response to the field from the information recorded on the magnetic medium (the signal field).

The pinned layer may be part of an antiparallel (AP) pinned layer structure which includes an antiparallel coupling (APC) layer formed between first and second AP pinned layers. The first AP pinned layer, for example, may be the layer that is exchange coupled to and pinned by the AFM pinning layer. By strong antiparallel coupling between the first and second AP pinned layers, the magnetic moment of the second AP pinned layer is made antiparallel to the magnetic moment of the first AP pinned layer. The AP-pinned structure is preferred over the single pinned layer because the magnetizations of the first and second pinned layers of the AP-pinned structure subtractively combine to provide a net magnetization that is less than the magnetization of the single pinned layer. The direction of the net magnetization is determined by the thicker of the first and second pinned layers. A reduced net magnetization equates to a reduced demagnetization field from the AP-pinned structure. Since the antiferromagnetic exchange coupling is inversely proportional to the net pinning magnetization, this increases exchange coupling between the first pinned layer and the antiferromagnetic pinning layer. The AP-pinned spin valve sensor is described in commonly assigned U.S. Pat. No. 5,465,185 to Heim and Parkin which is incorporated by reference herein.

In a "self-pinned" spin valve sensor, however, the first AP pinned layer is not pinned by any AFM pinning layer but is rather "self-pinned". A spin valve sensor of this type relies on magnetostriction of the AP self-pinned layer structure as well as the air bearing surface (ABS) stress for pinning. The AFM pinning layer, which is typically as thick as 150 Angstroms, is no longer necessary for pinning so that a relatively thin sensor can be fabricated.

A dual/differential spin valve sensor is made of two spin valve structures which are separated by a relatively thick gap layer. The two spin valve structures yield signals of opposite polarity under common mode excitation, thereby resulting in rejection of common mode noise and providing a higher read resolution determined by the gap layer which separates the two structures. Both spin valve structures typically include an AP pinned layer structure with an associated AFM pinning layer. Unfortunately, the AFM setting process to establish 180° out-of-phase pinned structures becomes difficult for these types of sensors. Specifically, after setting the polarity of the first AFM pinning layer for the first spin valve structure, setting the opposite polarity of the second AFM pinning layer for the second spin valve structure disturbs the polarity of the first AFM pinning layer.

There is an existing need for a relatively thin dual/differential spin valve sensor which overcomes the difficulties of the AFM polarity setting process.

SUMMARY

It is a principal object to provide a dual/differential giant magnetoresistive (GMR) sensor which yields signals of opposite polarity under common mode excitation, thereby resulting in rejection of common mode noise and providing a higher read resolution. The dual/differential sensor includes first and second spin valve structures which are separated by a nonmagnetic gap layer. Each one of the spin valve structures includes first and second thin film layer structures of ferromagnetic (FM) material separated by a thin film layer of nonmagnetic material. The direction of magnetism in the first layer structure is free to rotate in response to an applied external magnetic field (the "free layer structure"). The direction of magnetism in the second layer structure is maintained in a fixed or pinned position and does not rotate when an external field is applied to the sensor (the "pinned layer structure"). By providing a sense current flow through the sensor, variations can be sensed in the resistivity of the sensor in response to an external magnetic field due to rotation of the magnetization in the free layer structure of ferromagnetic material.

According to the present invention, the first spin valve structure of the sensor includes an antiparallel (AP) pinned layer structure whereas the second spin valve structure of the sensor includes an AP self-pinned layer structure. The AP pinned layer structure has a magnetization direction which is fixed by an adjacent antiferromagnetic (AFM) pinning layer, whereas the AP self-pinned layer structure has a magnetization direction which is fixed by magnetostriction as well as air bearing surface (ABS) stress. The magnetization direction of the AP pinned layer structure is fixed in a direction antiparallel to the magnetization direction of the AP self-pinned layer structure. As will be described in more detail, the dual/differential spin valve sensor may be configured in one of two ways. In particular, the sensor may have either a top AP pinned layer structure and a bottom AP self-pinned layer structure or a top AP self-pinned layer structure and a bottom AP pinned layer structure.

Advantageously, what is discovered is a relatively thin dual/differential spin valve sensor which overcomes the difficulties of the prior art AFM polarity setting process where two AP pinned layer structures are utilized.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

A dual/differential spin valve sensor of a magnetic head includes a first spin valve structure having an antiparallel (AP) pinned layer structure and a second spin valve structure having an AP self-pinned layer structure. The AP pinned layer structure has a magnetization direction which is fixed by an adjacent antiferromagnetic (AFM) layer, whereas the AP self-pinned layer structure has a magnetization direction which is fixed by magnetostriction as well as air bearing surface (ABS) stress. The magnetization direction of the AP pinned layer structure is fixed in a direction antiparallel to the magnetization direction of the AP self-pinned layer structure. The dual/differential spin valve sensor may be configured to have either a top AP pinned layer structure and a bottom AP self-pinned layer structure or a top AP self-pinned layer structure and a bottom AP pinned layer structure. Advantageously, the dual/differential spin valve sensor is relatively thin and overcomes the difficulties of the prior art AFM polarity setting process where two AP pinned layer structures are utilized.

Figure 1:
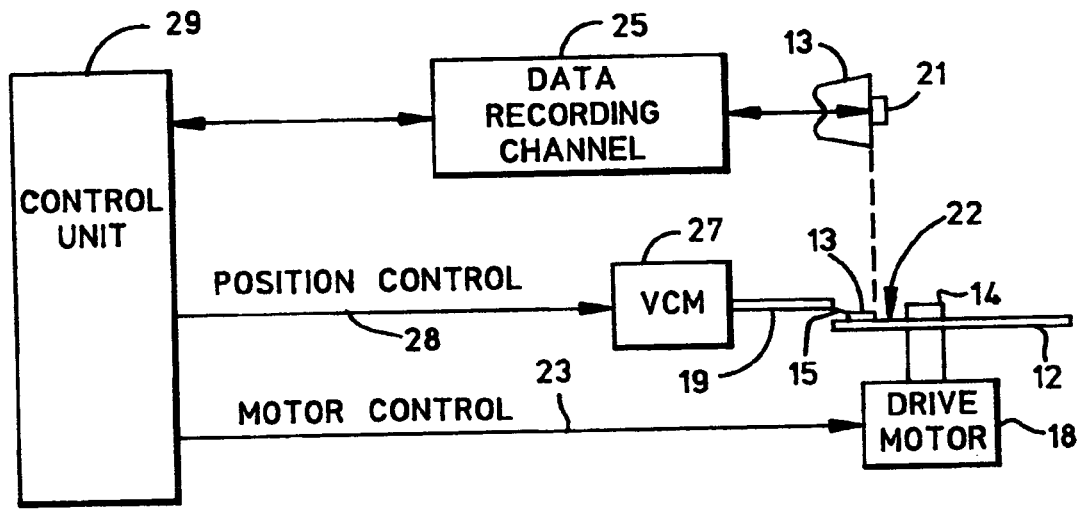
FIG. 1 is a simplified block diagram of a magnetic disk storage system embodying the present invention.

The following description is the best embodiment presently contemplated for carrying out the present invention. This description is made for the purpose of illustrating the general principles of the present invention and is not meant to limit the inventive concepts claimed herein. Referring to FIG. 1, although the invention is described as embodied in a magnetic disk storage system as shown in FIG. 1, it will be apparent that the invention is also applicable to other magnetic recording systems such as a magnetic tape recording system, for example, or other applications in which a sensor is utilized to detect a magnetic field. A magnetic disk storage system includes at least one rotatable magnetic disk 12 which is supported on a spindle 14 and rotated by a disk drive motor 18. The magnetic recording media on each disk is in the form of an annular pattern of concentric data tracks (not shown) on disk 12.

At least one slider 13 is positioned on disk 12, each slider 13 supporting one or more magnetic read/write transducers 21, typically referred to as read/write heads. As disks 12 rotate, sliders 13 are moved radially in and out over disk surface 22 so that heads 21 may access different portions of disk 12 where desired data is recorded. Each slider 13 is attached to an actuator arm 19 by means of a suspension 15. Suspension 15 provides a slight spring force which biases slider 13 against disk surface 22. Each actuator arm 19 is attached to an actuator means 27. Actuator means 27 as shown in FIG. 1 may be a voice coil motor (VCM), for example. The VCM includes a coil moveable within a fixed magnetic field, the direction and velocity of the coil movements being controlled by the motor current signals supplied by a controller.

During operation of the disk storage system, the rotation of disk 12 generates an air bearing between slider 13 and disk surface 22 which exerts an upward force or lift on the slider. The air bearing thus counterbalances the slight spring force of the suspension 15 and supports slider 13 off and slightly above the disk surface by a small, substantially constant spacing during operation.

The various components of the disk storage system are controlled in operation by control signals generated by a control unit 29, such as access control signals and internal clock signals. Typically, control unit 29 includes logic control circuits, storage means and a microprocessor, for example. Control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of sliders.

Figure 2:
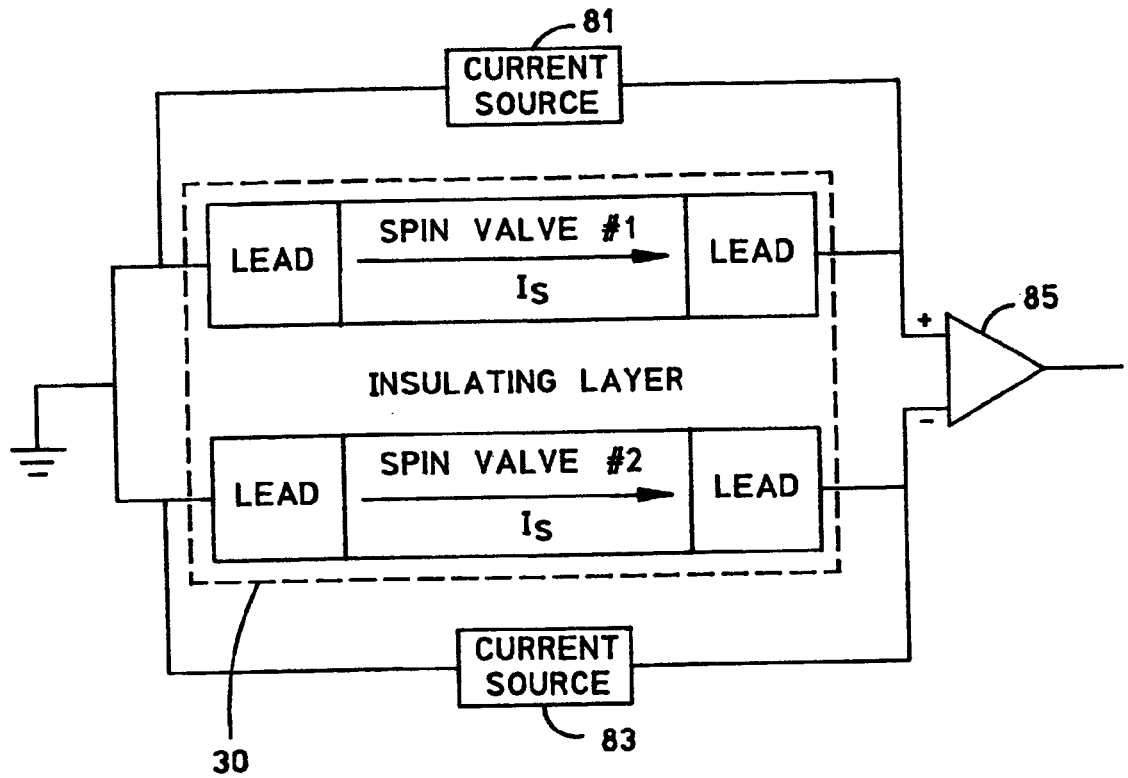
FIG. 2 is a block diagram illustrating a differential detection circuit utilizing the dual spin valve sensor shown in FIGS. 3, 4, and 5.

In FIG. 2, a block diagram illustrating a differential detection circuit utilizing a dual spin valve sensor 30 is shown. A current source 81 provides a constant bias or sense current $I_s$ to a first or bottom spin valve structure 32. Similarly, a current source 83 provides a constant sense current $I_s$ to a second or bottom spin valve structure 34. The current flows through both spin valves structures 32, 34 in the same direction. The output signal of each spin valve structure 32, 34 is applied to opposite polarity inputs, respectively, of a differential amplifier 85. The antiparallel magnetization of the pinned layers in both spin valves structures 32, 34 provides opposite resistance changes in the structures in response to an applied external field, such as a magnetic data signal recorded on a magnetic disk. The resistance changes and hence the output signal changes are additive at differential detector 85, thus providing a greater sensitivity. Using differential detection also provides common mode noise rejection, such as from thermal asperities.

Figure 3:
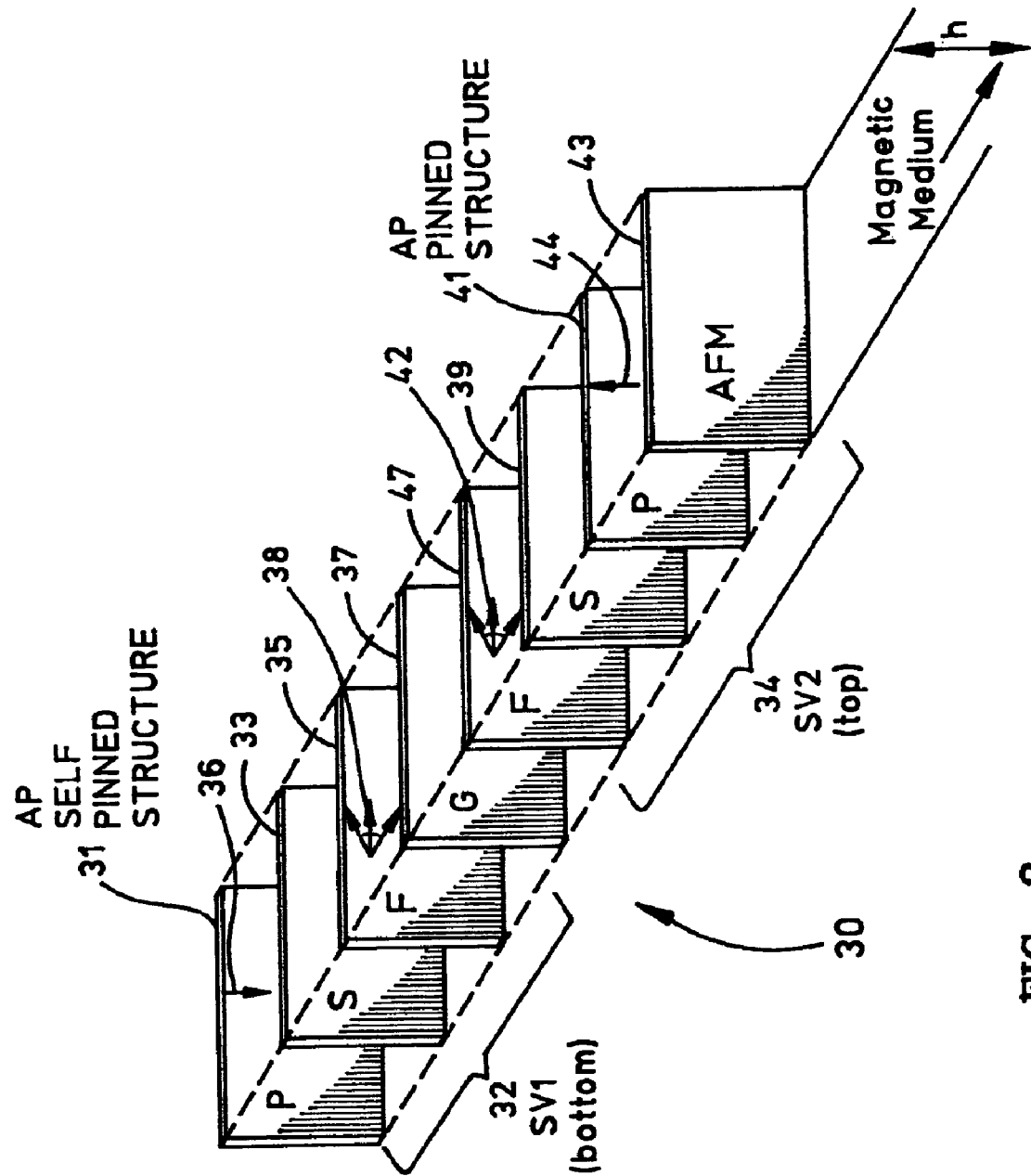
FIG. 3 is an exploded view in perspective of the dual spin valve sensor according to principles of the present invention.

Referring now to FIG. 3, a dual/differential spin valve sensor 30 according to a first embodiment of the present invention is shown. Sensor 30 includes first and second spin valve structures 32, 34 formed on a substrate and separated from each other by a thin layer of insulating gap material 37. Each spin valve structure 32, 34 has a first or "free" ferromagnetic (FM) layer 35, 47 separated by a thin nonmagnetic spacer layer 33, 39 from a second or "pinned" ferromagnetic (FM) layer 31, 41 in which the magnetization direction is fixed. Although not shown in detail in FIG. 3, each pinned layer 31 and 41 is actually a pinned layer structure which includes first and second FM layers with an antiparallel coupling (APC) layer sandwiched therebetween. A layer 43 of antiferromagnetic (AFM) material is deposited adjacent and in contact with pinned layer structure 41 to fix (i.e. pin) the magnetization direction in the pinned layer by exchange coupling. On the other hand, pinned layer structure 31 has a magnetization direction which is fixed by magnetostriction as well as air bearing surface (ABS) stress, not by AFM exchange coupling, and therefore may be referred to as a "self-pinned" layer structure. The magnetization direction (as shown by arrows 36 and 44) in the two pinned layer structures 31, 41 is set antiparallel so that variations in resistivity of sensor 30 in response to an external magnetic field can be sensed "differentially" due to rotation of the magnetization in free layers 35, 47 in each of spin valve structures 32 and 34.

The magnetizations of free layers 35, 47 of FM material are oriented parallel to each other (i.e. in the same direction), and at an angle of about 90° with respect to the magnetization direction of pinned layer structures 31, 41 in the absence of an externally applied magnetic field indicated by arrows 38 and 42. The magnetization direction of pinned layer structures 31, 41 is fixed antiparallel as shown by arrows 36 and 44. Thus, while the magnetization directions of pinned layer structures 31, 41 of remain fixed, the magnetizations in free layers 35, 47 are free to rotate their direction in response to an externally applied magnetic field (such as a magnetic field h), as shown by the dashed arrows in free layers 35, 47.

It is preferred that the magnetizations in free layers 35, 47, in the absence of an externally applied magnetic field, be oriented substantially 90° to that of pinned layer structures 31, 41 as shown in FIG. 3. This orientation produces the greatest sensitivity for sensor 30 in view of the equal excursions for both directions of rotation of the magnetization. To produce this orientation it is necessary to balance three competing magnetic fields which affect the magnetization direction in free layers 35, 47. One of these fields is the magnetostatic field from the pinned layer which reaches the free layer; another field is the interlayer coupling between the pinned and the free layers; and the third field is the magnetic field due to the sense current $I_s$ flow through sensor 30 (as shown in FIG. 2). It is desirable to choose the materials and thicknesses of the layers in such a way that the sense current necessary to achieve a substantially 90° orientation between the magnetization of the free and pinned layers is a value that is otherwise suitable for the application for which sensor 30 is to be used.

Figure 4:
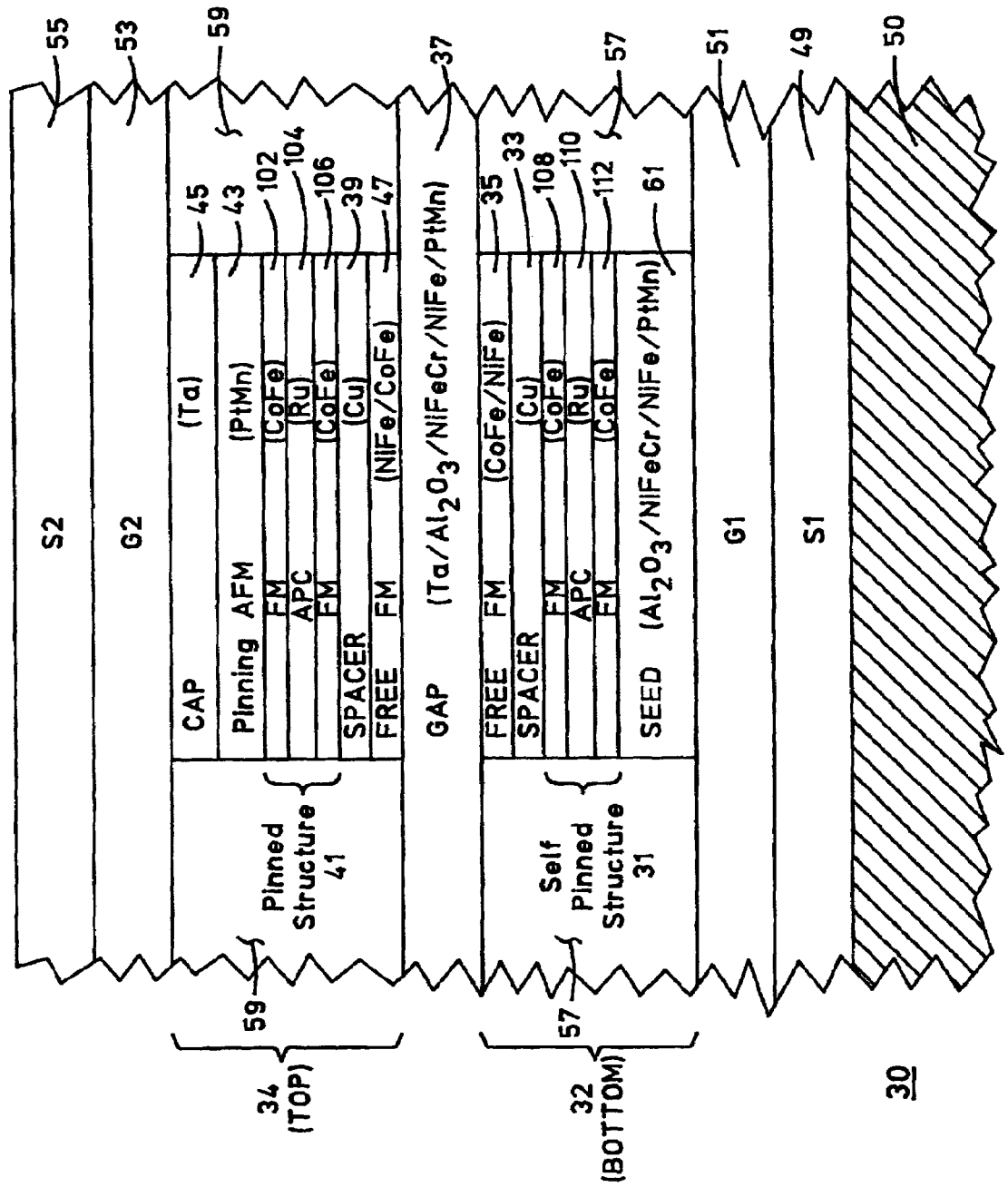
FIG. 4 is an air bearing surface (ABS) view of a first embodiment of the dual spin valve sensor of FIG. 3.

FIG. 4 is an air bearing surface (ABS) view of the first embodiment of dual/differential spin valve sensor 30 described in FIG. 3. FIG. 4 shows that bottom and top spin valve structures 32, 34 of sensor 30 are formed on a suitable substrate 50. Spin valve structures 32, 34 are separated by gap layer 37 of insulating material which electrically isolates one spin valve structure from the other. Spin valve structures 32, 34 are shown formed between two gap layers 51, 53 (G1 & G2) of insulating material which, in turn, are formed between two magnetic shield layers 49, 55 (S1 & S2) of a magnetic material. Sensor 30 is fabricated using well-known vacuum deposition and plating techniques. For example, first and second shield layers 49 and 55 may be plated over its surfaces, whereas first and second gap layers 51 and 53, first and second spin valve structures 32 and 34, and gap layer 37 may be sputter-deposited.

Bottom spin valve structure 32 as shown in FIG. 4 includes, from bottom to top, a seed layer 61, pinned layer structure 31, spacer layer 33 of nonmagnetic conductive material, and free layer 35. Pinned layer structure 31 includes first and second layers 108 and 112 of FM material and an AFM coupling (APC) layer 110 of nonmagnetic material sandwiched therebetween. As previously described in relation to FIG. 3, pinned layer structure 31 has a magnetization direction which is fixed by magnetostriction as well as air bearing surface (ABS) stress (not by exchange coupling) and therefore may be referred to as being "self-pinned". Note that the magnetization of free layer 35 is made perpendicular to the magnetization of pinned layer structure 31. Seed layer 61 is formed prior to deposition of the self-pinned structure 31 (lying directly underneath bottom FM layer 112) to promote proper growth of the various succeeding layers of spin valve structure 32. Electrical lead conductors 57 formed at opposite ends of bottom spin valve structure 32 provide connections to external circuitry and define the central active region of spin valve 32 (e.g. see FIG. 2). Gap layer 37 is formed on top of free layer 35 and leads 57.

Top spin valve structure 34 as shown in FIG. 4 includes, from bottom to top, free layer 47 of FM material, spacer layer 39 of nonmagnetic conductive material, pinned layer structure 41, pinning layer 43 of AFM material, and a cap layer 45. Pinned layer structure 41 of second spin valve structure 34 includes first and second layers 102 and 106 of FM material and an AFM coupling (APC) layer 104 of nonmagnetic material sandwiched in between layers 102 and 106. As previously described in relation to FIG. 3, pinning layer 43 of AFM material which is deposited adjacent and in contact with pinned layer structure 41 (top FM layer 102) to fix (i.e. pin) the magnetization direction in the pinned layer by exchange coupling.

In particular, an effective magnetic field is induced in FM layer 102 by exchange coupling between FM layer 102 and pinning layer 43 of AFM material. Since FM layer 106 is antiferromagnetically coupled with FM layer 102 through APC layer 104, both layers 102 and 106 are exchange-coupled to pinning layer 43, producing an effective magnetic field in FM layer 106 which is fixed in small and moderate externally applied magnetic fields. Note that the magnetization of free layer 47 is made perpendicular to the magnetization of pinned layer structure 41. Electrical lead conductors 59 formed at opposite ends of top spin valve structure 34 provide electrical connections to external circuitry and define the central active region of spin valve structure 34 (e.g. see FIG. 2). Note also that the magnetization of pinned layer structures 31, 41 are made antiparallel with respect to each other. It is preferred that the magnetization of the pinned layer structures 31, 41 be perpendicular to the sensor ABS and the media surface, and that the magnetization of free layers 35, 47 be parallel to the sensor ABS and media surface in the quiescent state (i.e. where no external magnetic field applied).

Specific layered materials are indicated in FIG. 4. Preferably as shown, seed layer 61 is a multi-layered seed layer structure made of $Al_2O_3$/NiFeCr/NiFe/PtMn (between 80–110 Angstroms); pinned layer structure 31 has FM layers 108 and 112 made of CoFe (between 15–20 Angstroms) and APC layer 110 made of Ru (between 4–8 Angstroms); spacer layer 33 is made of Cu (between 15–30 Angstroms); free layer 35 is made of CoFe/NiFe (between 20–40 Angstroms); gap layer is made of Ta/$Al_2O_3$/NiFeCr/NiFe/PtMn (between 50–200 Angstroms); free layer 47 is made of NiFe/CoFe (between 20–40 Angstroms); spacer layer 39 is made of Cu (15–30 Angstroms); pinned layer structure 31 has FM layers 102 and 106 made of CoFe (15–20 Angstroms) and APC layer 104 made of Ru (between 4–8 Angstroms); pinning layer 43 is made of PtMn (about 150 Angstroms); and cap layer 45 is made of Ta (between 20–40 Angstroms). Preferably, FM layers 102 and 112 are made of $Co_{50}Fe_{50}$ or other suitable material whereas FM layers 106 and 108 should be made of $Co_{90}Fe_{10}$ or pure cobalt (Co) for an increased GMR effect. Magnetic shield layers 49, 55 are of a highly permeable magnetic material such as NiFe or Sendust (AlSiFe). First and second gap layers 51, 53 may be formed of nonmagnetic insulating materials such as $Al_2O_3$ or $SiO_2$. Leads 57 and 59 should be of a low electrical resistivity material (i.e. a good electrical conductor) and also exhibit hardness and good corrosion resistance as the lead material can be exposed at the ABS. Tantalum (Ta) is a suitable material for lead conductors 57, 59.

Note that in the preferred embodiment described, the multi-layered seed layer 61 includes a layer of PtMn which is typically used as an AFM pinning layer if formed with a relatively large thickness (e.g. 150 Angstroms). However, the PtMn in this embodiment is made relatively thin (e.g. 30 Angstroms) and has no pinning effect on the AP pinned layer structure. Also, although specific materials and thicknesses have been described, any suitable materials and thicknesses may be utilized in the present structure. For example, FM layers 35 and 47 may be formed of any suitable magnetic material such as cobalt (Co), iron (Fe), nickel (Ni) and their alloys such as nickel-iron (NiFe), commonly referred to as Permalloy, nickel-cobalt (NiCo) and iron-cobalt (FeCo), for example. Conductive spacer layers 33 and 39 may be any other suitable nonmagnetic conductive materials such as gold (Au) or silver (Ag), for example. Pinning layer 43 of AFM material may be made of IrMn, for example. Seed layer 61 may be formed with only $Al_2O_3$NiFeCr or just NiFeCr, as examples.

Figure 5:
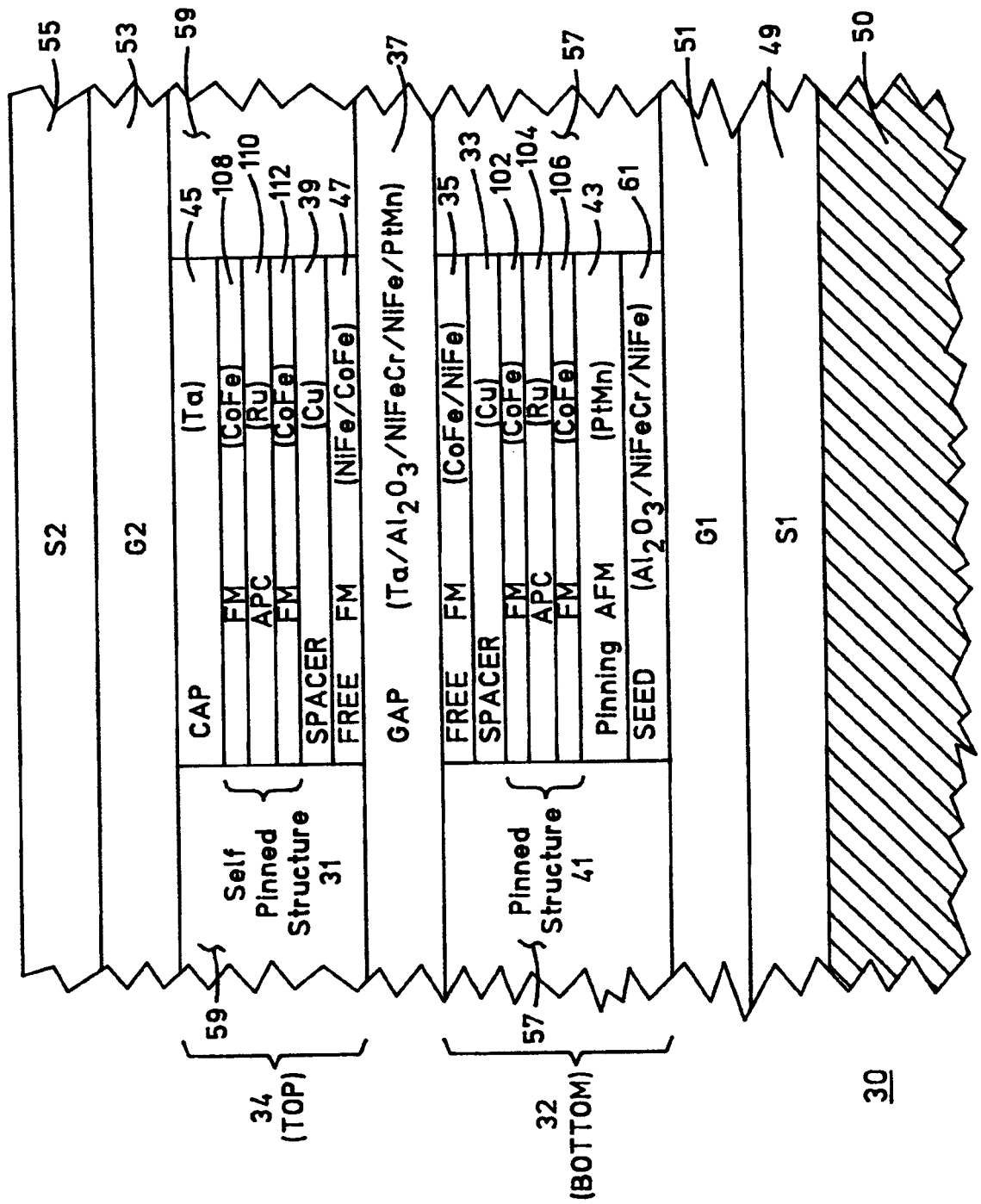
FIG. 5 is an ABS view of a second embodiment of a dual spin valve sensor.

FIG. 5 is an ABS view of dual/differential spin valve sensor 30 in a second embodiment. Sensor 30 is similar to that shown and described in relation to FIGS. 3–4, except that pinned layer structure 41 (being exchanged-coupled) is provided in bottom spin valve structure 32 and pinned layer structure 31 (being self-pinned) is provided in top spin valve structure 34. Thus, pinning layer 43 is provided adjacent to pinned layer structure 41 (i.e. FM layer 106) over seed layer 61 in bottom structure 32, and no pinning layer is required in top structure 34. Seed layer 61 no longer needs the thin PtMn layer (compare seed layer 61 of FIG. 4) but may be formed simply as $Al_2O_3$/NiFeCr/NiFe.

Dual/differential spin valve sensors are advantageous as they yield signals of opposite polarity under common mode excitation, thereby resulting in rejection of common mode noise and providing a higher read resolution determined by the gap layer which separates the two spin valve structures. Conventionally, the two spin valve structures include an AP pinned layer structure having an associated AFM pinning layer. Unfortunately, however, the AFM setting process to establish 180° out-of-phase pinned structures becomes difficult. Specifically, after setting the polarity of the first AFM pinning layer for the first spin valve structure, setting the opposite polarity of the second AFM pinning layer for the second spin valve structure disturbs the polarity of the first AFM pinning layer. In accordance with the present invention, one of the spin valve structures of the sensor includes an AP pinned layer structure and the other spin valve structures includes an AP self-pinned layer structure. Advantageously, setting the polarity of the single AFM pinning layer utilized in this sensor is not difficult since only one AFM pinning layer needs to be set.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A dual spin valve sensor for a magnetic head, comprising:
   first and second spin valve structures;
   a gap layer formed between the first and the second spin valve structures;
   the first spin valve structure including:
      an antiparallel (AP) pinned layer structure;
      a first free layer structure;
      a first non-magnetic electrically conductive spacer layer in between the AP pinned layer structure and the free layer structure;
      the AP pinned layer structure including:
         a first AP pinned layer;
         a second AP pinned layer;
         a first antiparallel coupling (APC) layer formed between the first and the second AP pinned layers; and
      an antiferromagnetic (AFM) layer formed adjacent the AP pinned layer structure for pinning one of the first and the second AP pinned layers;
   the second spin valve structure including:
      a second free layer structure;
      an antiparallel (AP) self-pinned layer structure;
      a second non-magnetic electrically conductive spacer layer in between the second free layer structure and the AP self-pinned layer structure;
      the AP self-pinned layer structure including:
         a third AP pinned layer;
         a fourth AP pinned layer; and
         a second antiparallel coupling (APC) layer formed between the third and the fourth AP pinned layers.

2. The dual spin valve sensor of claim 1, wherein the first spin valve structure is formed above the gap layer and the second spin valve structure is formed below the gap layer.

3. The dual spin valve sensor of claim 1, wherein the first spin valve structure is formed above the gap layer with the first free layer structure formed adjacent the gap layer, and wherein the second spin valve structure is formed below the gap layer with the second free layer structure formed adjacent the gap layer.

4. The dual spin valve sensor of claim 1, wherein the second spin valve structure is formed above the gap layer and the first spin valve structure is formed below the gap layer.

5. The dual spin valve sensor of claim 1, wherein the second spin valve structure is formed above the gap layer with the second free layer structure formed adjacent the gap layer, and wherein the first spin valve structure is formed below the gap layer with the first free layer structure formed adjacent the gap layer.

6. The dual spin valve sensor of claim 1, wherein at least one of the first and the second AP pinned layers comprises cobalt-iron iron ($Co_{90}Fe_{10}$).

7. The dual spin valve sensor of claim 1, wherein at least one of the first and the second AP pinned layers comprises cobalt-iron ($Co_{50}Fe_{50}$).

8. The dual spin valve sensor of claim 1, wherein the first free layer structure is formed in closer proximity to the gap layer than the AP pinned layer structure and the second free layer structure is formed in closer proximity to the gap layer than the AP self-pinned layer structure.

9. A disk drive comprising:
a magnetic head;
a support mounted in the housing for supporting the magnetic head so as to be in a transducing relationship with a magnetic disk;
a spindle motor for rotating the magnetic disk;
an actuator positioning means connected to the support for moving the magnetic head assembly to multiple positions with respect to said magnetic disk;
a processor connected to the magnetic head, to the spindle motor, and to the actuator for exchanging signals with the magnetic head for controlling movement of the magnetic disk and for controlling the position of the magnetic head;
the magnetic head including a read head;
the read head including a dual spin valve sensor which comprises:
first and second spin valve structures;
a gap layer formed between the first and the second spin valve structures;
the first spin valve structure including:
an antiparallel (AP) pinned layer structure;
a first free layer structure;
a first non-magnetic electrically conductive spacer layer in between the AP pinned layer structure and the free layer structure;
the AP pinned layer structure including:
a first AP pinned layer;
a second AP pinned layer;
a first antiparallel coupling (APC) layer formed between the first and the second AP pinned layers; and
an antiferromagnetic (AFM) layer formed adjacent the AP pinned layer structure for pinning one of the first and the second AP pinned layers;
the second spin valve structure including:
a second free layer structure;
an antiparallel (AP) self-pinned layer structure;
a second non-magnetic electrically conductive spacer layer in between the second free layer structure and the AP self-pinned layer structure;
the AP self-pinned layer structure including:
a third AP pinned layer;
a fourth AP pinned layer; and
a second antiparallel coupling (APC) layer formed between the third and the fourth AP pinned layers.

10. The disk drive of claim 9, wherein the first spin valve structure is formed above the gap layer and the second spin valve structure is formed below the gap layer.

11. The disk drive of claim 9, wherein the first spin valve structure is formed above the gap layer with the first free layer structure formed adjacent the gap layer, and wherein the second spin valve structure is formed below the gap layer with the second free layer structure formed adjacent the gap layer.

12. The disk drive of claim 9, wherein the second spin valve structure is formed above the gap layer and the first spin valve structure is formed below the gap layer.

13. The disk drive of claim 9, wherein the second spin valve structure is formed above the gap layer with the second free layer structure formed adjacent the gap layer, and wherein the first spin valve structure is formed below the gap layer with the first free layer structure formed adjacent the gap layer.

14. The disk drive of claim 9, wherein at least one of the first and the second AP pinned layers comprises cobalt-iron iron ($Co_{90}Fe_{10}$).

15. The disk drive of claim 9, wherein at least one of the first and the second AP pinned layers comprises cobalt-iron ($Co_{50}Fe_{50}$).

16. The disk drive of claim 9, wherein the first free layer structure is formed in closer proximity to the gap layer than the AP pinned layer structure and the second free layer structure is formed in closer proximity to the gap layer than the AP self-pinned layer structure.

17. A dual/differential spin valve sensor, comprising:
first and second spin valve structures;
a gap layer formed between the first and the second spin valve structures;
the first spin valve structure including:
an antiferromagnetic (AFM) pinning layer;
an antiparallel (AP) pinned layer structure formed below the AFM pinning layer;
a first free layer structure formed above and in closer proximity to the gap layer than the AP pinned layer structure;
a first non-magnetic electrically conductive spacer layer in between the AP pinned layer structure and the free layer structure;
the AP pinned layer structure including:
a first AP pinned layer;
a second AP pinned layer;
wherein one of the first and the second AP pinned layers is pinned by the AFM layer;
a first antiparallel coupling (APC) layer formed between the first and the second AP pinned layers; and
the second spin valve structure including:
an antiparallel (AP) self-pinned layer structure;
a second free layer structure formed below and in closer proximity to the gap layer than the AP self-pinned layer structure;
a second non-magnetic electrically conductive spacer layer in between the second free layer structure and the AP self-pinned layer structure;
the AP self-pinned layer structure including:
a third AP pinned layer;
a fourth AP pinned layer;
a second antiparallel coupling (APC) layer formed between the third and the fourth AP pinned layers; and wherein one of the third and the fourth AP pinned layers is pinned by magnetostriction and air bearing surface (ABS) stress.

18. The dual/differential spin valve sensor of claim 17, wherein no AFM pinning layer is needed for pinning the AP self-pinned layer structure.

19. The dual/differential spin valve sensor of claim 17, wherein the AFM pinning layer comprises PtMn.

20. The dual/differential spin valve sensor of claim 17, further comprising:
a seed layer formed underneath the AP self-pinned layer structure.

21. The dual/differential spin valve sensor of claim 17, further comprising:
a seed layer formed underneath the AP self-pinned layer structure; and
the seed layer including a platinum-manganese (PtMn) layer which has no pinning effect on the AP self-pinned layer structure.

22. The dual/differential spin valve sensor of claim 17, wherein the first and the second AP pinned layers comprise CoFe.

23. The dual/differential spin valve sensor of claim 17, wherein the first and the second free layer structures comprise NiFe and CoFe.

24. The dual/differential spin valve sensor of claim 17, wherein the first and the second free layer structures comprise NiFe and CoFe.

25. The dual/differential spin valve sensor of claim 17, wherein no AFM pinning layer is needed for pinning the AP self-pinned layer structure.

26. The dual/differential spin valve sensor of claim 17, wherein the AFM pinning layer comprises PtMn.

27. The dual/differential spin valve sensor of claim 17, further comprising:
a seed layer formed underneath the second APC layer.

28. The dual/differential spin valve sensor of claim 17, further comprising:
a seed layer formed underneath the second APC layer; and
the seed layer including a platinum-manganese (PtMn) layer which has no pinning effect on the AP self-pinned layer structure.

29. The dual/differential spin valve sensor of claim 17, wherein the first and the second AP pinned layers comprise CoFe.

30. A dual/differential spin valve sensor, comprising:
first and second spin valve structures;
a gap layer formed between the first and the second spin valve structures;
the first spin valve structure including:
an antiparallel (AP) self-pinned layer structure;
a first free layer structure formed above and in closer proximity to the gap layer than the AP self-pinned layer structure;
a first non-magnetic electrically conductive spacer layer in between the AP self-pinned layer structure and the first free layer structure;
the AP self-pinned layer structure including:
a first AP pinned layer;
a second AP pinned layer;
a first antiparallel coupling (APC) layer formed between the first and the second AP pinned layers;
wherein one of the first and the second AP pinned layers is pinned by magnetostriction and air bearing surface (ABS) stress;
the second spin valve structure including:
an antiparallel (AP) pinned layer structure;
a second free layer structure formed below and in closer proximity to the gap layer than the AP pinned layer structure;
a second non-magnetic electrically conductive spacer layer in between the second free layer structure and the AP pinned layer structure;
an antiferromagnetic (AFM) pinning layer formed below the AP pinned layer structure;
the AP pinned layer structure including:
a third AP pinned layer;
a fourth AP pinned layer;
wherein one of the third and the fourth AP pinned layers is pinned by the AFM pinning layer; and
a second antiparallel coupling (APC) layer formed between the third and the fourth AP pinned layers.

* * * * *